Patented May 7, 1946

2,400,020

UNITED STATES PATENT OFFICE 2,400,020

CATALYTIC CRACKING OF HYDROCARBON OILS

Jerry A. Pierce and Clellie T. Steele, Baton Rouge, La., assignors to Standard Oil Development Company, a corporation of Delaware No Drawing. Application October 22, 1943, Serial No. 507,296

2 Claims. (Cl. 196—52)

This invention relates to a process for producing catalytic materials and pertains more particularly to catalytic materials adapted for the conversion of hydrocarbon oils.

It has heretofore been known that clays of the bentonite type after being acid treated form active catalysts for the conversion of hydrocarbon oils and particularly for the cracking of such oils into motor fuels. The motor fuel so produced is of materially better quality with respect to anti-knock characteristics than that produced by conventional thermal cracking processes.

The acid treatment of clays as generally practiced in this country involves digesting the clay with from 20% to 35% of its weight of 100% sulfuric acid diluted to a concentration of from 5% to 15%. The actual weight per cent of the undiluted acid used, based on the weight of dry clay treated, is commonly known as the "dosage" as distinguished from the "concentration" of the acid.

It has also been proposed to employ other types of inorganic acids, such as nitric, hydrochloric, hydrofluoric, and phosphoric, in place of sulfuric acid but the latter acid is the one most commonly used.

We have found that the activity of clay catalysts for the conversion of hydrocarbon oils, and particularly for the cracking of such oils, may be considerably improved by using an organic acid such as oxalic acid in combination with the inorganic acid for treatment of the raw clay. The combination of oxalic acid with sulfuric acid has been found to be particularly advantageous for producing a cracking catalyst of high activity from raw clay.

The treatment of the clay with this combination of acids is subject to wide variations. For example, the clay may be treated first with the sulfuric acid and then with oxalic acid, or this order of treatment may be reversed. A further modification comprises treating the clay with the two acids simultaneously. Good results may be obtained by using the aforementioned sulfuric acid dosage of 20% to 35%. However, it has also been found that improved results may be obtained in some cases by using higher acid dosages, for example, of the order of 50% to 100%. The dosage of oxalic acid used may be from about 10% to 35% by weight of the clay treated. However, the preferred dosage is about 25%. Good results have been obtained by using a 25% dosage of each acid. The preferred concentration of the acids for treatment of the clay is about 5–15% for the sulfuric acid and 2–15% for the oxalic acid. However, the invention is not limited to these concentrations. While active catalysts have been prepared by treatment with this combination of acids at temperatures as low as 125° F., a temperature in the range of from 175° to 210° F. has produced catalysts of the best activity.

A further modification of this invention involves impregnation of the clay with activating constituents following the treatment with sulfuric acid and oxalic acid. While a variety of activating materials may be used to modify the characteristics of the catalyst, alumina is the one which has been used to best advantage. The treated clay may be impregnated with a solution of aluminum sulfate which, after draining off the supernatant liquid, may be precipitated on the clay in the form of the hydrous oxide by treatment with ammonia. However, other methods of impregnation and mixing of the impregnated material, for example, those involving thermal decomposition of the impregnating agent to form the desired oxide on the clay, may be used.

The following example is given to illustrate some of the details involved in the preparation of an active catalyst in accordance with this invention. A weighed amount of raw bentonite is treated with sufficient oxalic acid and water to give a dosage of 25% and a concentration of 5%. In calculating the amount of water to be used to give the desired concentration, the water content of the clay as determined by ignition is included. In other words, all calculations are on a dry basis. The mixture of clay and oxalic acid solution forms a slurry which is heated with agitation at a temperature of about 185° F. for 5 hours. While the treated clay may be filtered and washed if desired before the next stage of the treatment with sulfuric acid, it has been found that equally good or improved results may be obtained by adding the calculated amount of sulfuric acid and water directly to the slurry of oxalic acid. In one particular example, the quantities are adjusted to give a 75% dosage and 12.5% concentration. This second stage of the treatment is also carried out for 5 hours at 185° F. with agitation to insure a uniform product. The hot slurry is quenched with about an equal volume of cold water and the mixture allowed to cool to room temperature. It is then filtered and washed until free of sulfate as determined by test with barium chloride. The filtered material is dried in a steam oven for a period of about 12 hours at 175° F. It is then formed into any desired shape for use in fixed bed operation or ground to a fine powder for use in fluid catalyst operation. In either case it is activated at 850° F. for three hours prior to use.

The following examples illustrate more specifically some of the methods of preparing the catalysts and the activity of the catalysts so prepared.

In each of the following examples, the activity of the catalyst was determined by passing an East Texas gas oil having an A. P. I. gravity of about 33.8 through a column containing the catalyst in the form of $\tfrac{1}{8}''$ pellets. The oil was passed through the catalyst at a space velocity of 0.6 volume of liquid per hour per volume of catalyst at a temperature of 850° F. for a cracking period of 2 hours, after which the catalyst was regenerated with a mixture of air and nitrogen and the cracking cycle repeated. The total liquid product from the cracking reaction was condensed and afterwards distilled. The amount vaporized below 400° F. indicates the proportion of gasoline formed during the cracking operation.

Example 1

A raw bentonite found in Arizona and designated as Cheto bentonite was treated in the laboratory with 35% of sulfuric acid of a concentration of 15%. It was then washed, dried and formed into pellets. It was tested as described above. The results of this test as well as comparative tests are shown in the table appearing hereinafter.

Example 2

Another sample of Cheto bentonite was treated with 25% by weight of sulfuric acid in 12.5% concentration. The treated clay was filtered and washed and then further treated with 25% by weight of oxalic acid in 12.5% concentration. It was again filtered and washed and then formed into pellets. It was tested as described above and the results are shown in the table hereinafter.

Example 3

A bentonite obtained from Mississippi and designated as Chisholm bentonite was treated for 6 hours with 75% by weight of sulfuric acid in 12.5% concentration. The treated clay was filtered, washed, dried and formed into pellets for testing as described above. The results are shown in the table.

Example 4

A sample of the same Chisholm bentonite used in Example 3 was treated first with 25% of oxalic acid in 12.5% concentration for 5 hours. The resulting slurry was filtered and washed. It was next treated with 75% sulfuric acid in 12.5% concentration for 5 hours after which it was again filtered and washed. It was formed into pellets after drying and tested as described above. The results are shown in the table.

Example 5

Chisholm bentonite was treated with 25% by weight of oxalic acid of 5% concentration. The resulting slurry was filtered and washed. The clay was then treated with 75% sulfuric acid of 12.5% concentration. It was then filtered, washed and formed into pellets after drying. It was tested as described above and the results are shown in the table.

Example 6

The material obtained in Example 5 before drying and forming was further treated with an aluminum sulfate solution of such concentration that when the treated material was contacted with ammonium hydroxide solution about 5% of aluminum oxide was deposited on the clay. This material was filtered, washed, formed into pellets and tested as described above. The results are shown in the table.

Example 7

Chisholm bentonite was treated for 5 hours with 25% oxalic acid in 5% concentration. This slurry without filtration or washing was then blended with sulfuric acid to give a dosage of 75% and a concentration of 10% of sulfuric acid. The treatment was continued for 5 hours. The treated clay was then filtered, washed, dried, formed and tested as described above. The results are shown in the table.

| Ex. | Dosage | Conc. | Cycle | Vol. percent gasoline | Vol. percent gas oil |
|---|---|---|---|---|---|
|   |   | Per cent |   |   |   |
| 1 | 35% $H_2SO_4$ | 15 | 1 | 38.0 | 61.2 |
|   |   |   | 2 | 36.0 |   |
| 2 | 25% $H_2SO_4$ | 12.5 | 1 | 41.0 | 56.9 |
|   | 25% $(COOH)_2$ | 12.5 | 2 |   |   |
| 3 | 75% $H_2SO_4$ | 12.5 | 1 | 48.5 | 45.1 |
|   |   |   | 2 | 48.5 | 44.7 |
| 4 | 25% $(COOH)_2$ | 12.5 | 1 | 57.5 | 34.4 |
|   | 75% $H_2SO_4$ | 12.5 | 2 | 51.0 | 42.1 |
| 5 | 25% $(COOH)_2$ | 5 | 1 | 50.0 | 43.6 |
|   | 75% $H_2SO_4$ | 12.5 | 2 | 46.0 | 46.7 |
|   |   |   | 3 | 46.0 | 47.7 |
| 6 | Do 5+$Al_2O_3$ |   | 1 | 54.5 | 38.6 |
|   |   |   | 2 | 51.5 | 42.7 |
| 7 | 25% $(COOH)_2$ | 5 | 1 | 51.0 | 44.2 |
|   | 75% $H_2SO_4$ | 10 | 2 | 51.0 | 44.4 |
|   |   |   | 3 | 51.0 | 46.1 |

A comparison of the results obtained in Examples 1 and 2 shows that treatment of a clay with oxalic acid following a normal treat with sulfuric acid improves the activity of the catalyst. The results obtained in Examples 3 and 4 show that treatment of the clay with oxalic acid before a heavy treat with sulfuric acid also gives a catalyst of improved activity. In Examples 5 and 6 the data show that alumina impregnation of a clay which has been treated with both oxalic acid and sulfuric acid produces a catalyst of improved properties. Example 7 illustrates the point that in the preparation of the catalyst the sulfuric acid treat may follow the oxalic acid treat without any intermediate filtration or washing and without detriment to the catalyst.

Having described the preferred embodiment of the invention, it will be understood that it embraces such other variations and modifications as set forth in the accompanying claims.

We claim:

1. A process for cracking hydrocarbon oils which comprises passing the oil to be cracked in contact with an active catalyst comprising a bentonite clay activated by treatment with oxalic acid, the amount of said acid in pure state being at least 20% of the weight of the clay, and keeping the oil in contact with said catalyst while at cracking temperature for a period sufficient to obtain the desired cracking thereof.

2. A process for cracking hydrocarbon oils which comprises passing said oil to be cracked in contact with an active catalyst comprising a bentonite clay which has been activated by successive treatment with oxalic acid and sulfuric acid, the amount of acid used being at least 50% of the weight of the clay, keeping the oil in contact with the clay at cracking temperature for a period sufficient to convert a substantial portion into lower boiling hydrocarbon oil.

JERRY A. PIERCE.
CLELLIE T. STEELE.